US008859950B2

(12) United States Patent
Pascoguin et al.

(10) Patent No.: US 8,859,950 B2
(45) Date of Patent: Oct. 14, 2014

(54) COMPLETE OPTICAL ENCAPSULATION OF PARTICULATES

(75) Inventors: Bienvenido Melvin L. Pascoguin, La Mesa, CA (US); Ryan P. Lu, San Diego, CA (US); Ayax D. Ramirez, Chula Vista, CA (US)

(73) Assignee: The United States of America as represented by Secretary of the Navy, Washington, DC (US)

( * ) Notice: Subject to any disclaimer, the term of this patent is extended or adjusted under 35 U.S.C. 154(b) by 0 days.

(21) Appl. No.: 13/532,372

(22) Filed: Jun. 25, 2012

(65) Prior Publication Data

US 2013/0341500 A1   Dec. 26, 2013

(51) Int. Cl.
    *G21K 1/00*     (2006.01)
    *G03H 1/00*     (2006.01)
    *G03H 1/02*     (2006.01)

(52) U.S. Cl.
    CPC ........ *G21K 1/006* (2013.01); *G03H 2001/0077* (2013.01); *G03H 1/0005* (2013.01)
    USPC ...................................................... 250/251

(58) Field of Classification Search
    CPC ............... G21K 1/006; G02B 27/1086; G02B 27/1093; G01N 21/645; G01N 21/6458
    USPC ...................................................... 250/251
    See application file for complete search history.

(56) References Cited

U.S. PATENT DOCUMENTS

| 4,252,606 | A | * | 2/1981 | Sclufer | 376/104 |
| 6,055,106 | A | * | 4/2000 | Grier et al. | 359/566 |
| 8,174,742 | B2 | * | 5/2012 | Roichman et al. | 359/1 |
| 8,179,577 | B2 | * | 5/2012 | Roichman et al. | 359/1 |
| 2003/0066956 | A1 | * | 4/2003 | Gruber et al. | 250/251 |
| 2003/0193984 | A1 | * | 10/2003 | Ozkan et al. | 372/93 |
| 2004/0209281 | A1 | * | 10/2004 | Monajembashi | 435/6 |

OTHER PUBLICATIONS

Generation of a beam with a dark focus surrounded by regions of higher intensity: the optical bottle beam by: J. Arlt, M. J. Padgett Feb. 15, 2000 / vol. 25, No. 4 / Optics Letters.*
Jeffrey A. Davis et al., Encoding amplitude information onto phase-only filters, Applied Optics, Aug. 10, 1999, pp. 5004-5013, vol. 38 No. 23, Optical Society of America, USA.

(Continued)

*Primary Examiner* — Jack Berman
*Assistant Examiner* — Sean Luck
(74) *Attorney, Agent, or Firm* — SPAWAR Systems Center Pacific; Kyle Eppele; Peter A. Lipovsky

(57) ABSTRACT

Methods enable the capture and manipulation of minute particles. One method includes locating a particle on a specimen stage; generating a finite-length open-ended hollow tube laser output around the particle; generating opposing end-cap laser outputs at either end of the hollow tube laser output to enclose the particle; and moving at least one of the specimen stage, hollow tube laser output and end cap laser outputs to re-position the particle. Another method includes locating a particle on a specimen stage; generating a first finite-length open-ended hollow tube laser output around the particle; generating a second finite-length open-ended hollow tube laser output around the particle, whereby the particle becomes enclosed at the intersection of the first and second hollow tube laser outputs; and pivoting at least one of the first and second hollow tube laser outputs such that the particle is re-positioned.

8 Claims, 12 Drawing Sheets

(56) References Cited

OTHER PUBLICATIONS

Jeffrey A. Davis et al.,Transmission variations in liquid crystal spatial light modulators caused by interference and diffraction effects, Optical Engineering, Jun. 1999, pp. 1051-1057, vol. 38 No. 6, Society of Photo-Optical Engineers, USA.

K. T. Gahagan et al., Optical vortex trapping of particles, Optics Letters, Jun. 1, 1996, pp. 827-829, vol. 21 No. 11, Optical Society of America, USA.

V. V. Kotlyar et al. Diffraction of a plane, finite-radius wave by a spiral phase plate, Optics Letters, Jun. 1, 2006, pp. 1597-1599, vol. 31 No. 11, Optical Society of America, USA.

Jeffrey A. Davis et al., Fourier transform pupil functions for modifying the depth of focus of optical imaging systems, Applied Optics, Sep. 10, 2009, pp. 4893-4898, vol. 48 No. 26, Optical Society of America, USA.

M. A. A. Neil et al., A wavefront generator for complex pupil function synthesis and point spread function engineering, Journal of Microscopy, Mar. 2000, pp. 219-223, vol. 197 Pt. 3, The Royal Microscopical Society, GB.

* cited by examiner

COMPLETE OPTICAL ENCAPSULATION OF PARTICULATES

FEDERALLY-SPONSORED RESEARCH AND DEVELOPMENT

Title to this invention is assigned to the United States Government. Licensing inquiries may be directed to Office of Research and Technical Applications, Space and Naval Warfare Systems Center, Pacific, Code 72120, San Diego, Calif., 92152; telephone 619-553-2778; email: T2@spawar.navy.mil. Please reference Navy Case No. 101263.

BACKGROUND

This disclosure relates generally to the field of optical particle control and more particularly to the field of optical dielectric particle control and manipulation.

Optical tweezers (otherwise known as "single-beam gradient force traps") are scientific instruments that use a highly-focused laser beam to provide an attractive or repulsive force (typically on the order of piconewtons), to physically hold and move microscopic dielectric objects. Optical tweezers have recently been particularly useful in a variety of biological studies.

Optical tweezers are capable of manipulating nanometer and micrometer-sized dielectric particles via extremely small forces of a highly focused laser beam. The beam is typically focused through a microscope objective lens. The narrowest point of the focused beam, known as the beam waist, contains a very strong electric field gradient. Dielectric particles are attracted along the gradient to the region of strongest electric field, which in this case is the center of the focused beam. The laser light also tends to apply a force on particles in the beam along the direction of beam propagation. This force can be explained and envisioned when light is considered to be a group of particles, wherein each of the light particles impinges on the tiny dielectric particle in its path. Such an interaction is known as the scattering force and results in the dielectric particle being displaced slightly downstream from the exact position of the beam waist.

Optical tweezers are very sensitive instruments and are capable of the manipulation and detection of sub-nanometer displacements for sub-micrometer dielectric particles. For this reason, they are often used to manipulate and study single molecules wherein the molecule is typically bonded to a bead attached to the molecule. Deoxyribo Nucleic Acid (DNA) and the proteins and enzymes that interact with it are commonly studied in this way.

Proper explanation of optical trapping behavior depends upon the wavelength of light used in the trapping compared to the size of the particle to be trapped. In cases where the wavelength is much smaller than the dimensions of the particle, a simple ray optics treatment is sufficient. If the wavelength of light far exceeds the particle dimensions, the particles can be treated as electric dipoles in an electric field. For optical trapping of dielectric objects of dimensions within an order of magnitude of the trapping beam wavelength, the only accurate models involve the treatment of either time dependent or time harmonic Maxwell equations using appropriate boundary conditions.

As indicated, in cases where the wavelength of light is significantly smaller than the diameter of a trapped particle, the trapping phenomenon can be explained using ray optics. Individual rays of light emitted from the laser will be refracted as it enters and exits a dielectric particle. As a result, the ray will exit in a direction different from that of its origin. Since light has momentum associated with it, the change in the direction of the light indicates that the momentum of the light has changed. Newton's third law dictates that there should be an equal and opposite momentum change on the particle.

Most optical traps operate with a Gaussian beam ($TEM_{00}$ mode) profile intensity. If the particle is displaced from the center of the beam, the particle has a net force returning it to the center of the trap. A more intense beam imparts a larger momentum change towards the center of the trap while a lesser intense beam imparts a smaller momentum change away from the trap center. In either case, the net momentum change, or force, returns the particle to the trap center.

If a particle is located at the center of the beam, then individual rays of light are refracting through the particle symmetrically, resulting in no net lateral force. The net force in this case is along the axial direction of the trap, which cancels out the scattering force of the laser light. The cancellation of the axial gradient force with the scattering force is what causes the particle-bead to be stably trapped slightly downstream of the beam waist.

Prior art techniques of controlling and manipulating minute particles are generally limited to single a particle or are made much more complex to enable multiple particle use. Additionally, common optical tweezing operations become unmanageable when it is desired to lift particles over walls or barriers, resulting either in an inability to adequately manipulate the particles or a loss of the particle itself. It is thus desirable to have particle manipulation capability that readily allows control and movement of multiple particles, does so with minimal complexity, and in addition provides relative ease and efficiency in the three dimensional manipulation and control of particles over obstructions.

SUMMARY

Methods are disclosed that enable the capture and manipulation of minute particles. Such objects are typically on the order of a single micron level, $10^{-6}$ meters in diameter. One embodiment includes locating a particle on a specimen stage; generating a finite-length open-ended hollow tube laser output around the particle so that the particle is within the hollow tube laser output; generating opposing end-cap laser outputs at either end of the hollow tube laser output wherein the particle is enclosed by the hollow tube laser output and the end-cap laser outputs; and moving at least one of the specimen stage, hollow tube laser output and end cap laser outputs to re-position the particle from a first position to a second position. Another embodiment includes locating a particle on a specimen stage; generating a first finite-length open-ended hollow tube laser output around the particle so that the particle is within the first hollow tube laser output; generating a second finite-length open-ended hollow tube laser output around the particle so that the particle is within the second hollow tube laser output, whereby the particle becomes enclosed at the intersection of the first and second hollow tube laser outputs; and pivoting at least one of the first and second hollow tube laser outputs such that the particle is re-positioned from a first position to a second position.

DETAILED DESCRIPTION

Figure 1:
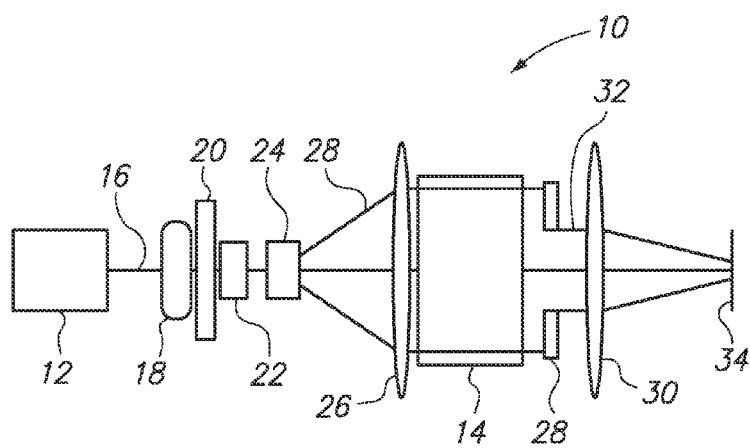
FIG. 1 illustrates an exemplary laser apparatus as may be used according to the description herein.

Referring now to FIG. 1, there is shown a laser apparatus 10 as may be utilized in carrying out the various methods of capturing and relocating particles according to the description herein. Apparatus 10 includes a source of laser light 12, such as a conventional pulsed or continuous wave laser or alternatively a light emitting diode. Laser light source 12 is chosen for its compatibility to a programmable optical filter 14 used herein, as will be described further. Light beam 16 from source 12 is passed to an optional neutral density filter 18 selected to control the amplitude of laser light 16 so as to not burn a particle to be controlled. Next, light beam 16 is passed through a half waveplate 20 chosen to appropriately rotate the polarization of the beam 16 to match the polarization of filter 14. Following is a linear polarizer 22 chosen to align the polarization of light 16 to that of filter 14. Next following is a spatial filter 24 selected to adequately enlarge beam 16 to coincide with the dimensions of programmable filter 14. Collimating lens 26 is used to collimate the widened beam 28 from spatial filter 24 for input to programmable light filter 14.

Programmable light filter 14 is ultimately used to generate either a finite-length open-ended hollow tube laser output or end-cap laser outputs as utilized in the embodiments described herein. A typical such filter is a liquid crystal spatial light modulator (LCSLM) though other programmable light modulators may also be used.

A phase modulating LCSLM includes a liquid-crystal-on-silicon (LCOS) backplane, a nematic liquid-crystal layer, and a cover glass coated with a transparent electrode. The LCOS backplane is an array of aluminum pixels, which serve as both reflective mirrors and electrodes. Each electrode is an independently controllable pixel resulting in a fully programmable high-resolution phase-modulating array. As is understood in this field of optical control, optical modulation of the LCSLM is achieved by applying a voltage across the LC layer from the backplane pixels to the transparent electrode on the cover glass. As light enters the LC layer polarized along the extraordinary axis, the light is delayed or phase shifted. The amount of the phase shift depends primarily on three factors: the birefringence of the LC material, the thickness of the LC layer, and the wavelength of the input light.

As an electric field is applied to a nematic LC layer, there is a corresponding change in the birefringence of the LC material, and a change in the phase shift is induced. The index change induces a phase-only modulation of the input light.

Spatial light modulators offer many benefits. They are high resolution, currently having as many as 1024×1024 fully functional independently controllable pixels. Such high resolution in combination with independent pixel control allows SLMs to represent phase shifts with a much larger dynamic range than deformable mirrors. (DMs). They are low cost, currently less than $0.08 per pixel for a 512×512 SLM. In addition, SLMs are small, lightweight, and require low power.

While some SLMs have the drawbacks of decreased diffraction efficiency, slower response times, polarization dependence, and wavelength dependence, many of these drawbacks can be overcome. With the addition of a dielectric stack to the backplane of the SLM, diffraction efficiencies of 94% have been measured. Likewise, with the combination of new liquid crystals and a slightly higher-voltage backplane, a phase modulator was built and verified to be capable of sub-millisecond response times. Polarization independence has been successfully demonstrated with the addition of a quarter-wave stack to the SLM backplane. This leaves the primary limitation of operation with monochromatic light only, which is acceptable for some adaptive-optics applications such as laser communications.

Spatial light modulators have the ability to compensate for hundreds of waves of aberration through the use of modulo-$2\pi$ operation. Thus, a device with only slightly more than one wave of phase stroke can emulate large phase strokes. The benefits of small phase stroke are that the wavefront corrector is fast, compact, easy to drive, and inexpensive to fabricate. For such an implementation to work properly the phase response of the LC must be linearized over 0 to $2\pi$, and any backplane distortion must be calibrated out. Automatic algorithms to perform these calibrations have been developed, making it possible to quickly and accurately characterize SLMs. Consequently, it has been possible to demonstrate the ability of a SLM to compensate for large higher-order zonal aberrations. Because of the modulo-$2\pi$ operation of the SLM, these calibrations are optimal for one particular wavelength, limiting use of an SLM to the wavelength for which it was designed and calibrated.

The specific details of the implementation of programmable light filter 14 to provide the hollow tube laser outputs and end-cap laser outputs as used herein will be provided herein. For the moment however the remainder of laser apparatus 10 used to provide these outputs will be described.

Returning now to FIG. 1, the light filtered through programmable light filter 14 is then passed through circular aperture 28 that acts as a control of the hollow-tube and end-cap laser outputs ultimately desired from laser apparatus 10. A positive (converging) lens 30 takes the Fourier Transform of the programmably patterned light 32 onto a specimen stage 34.

Figure 2:
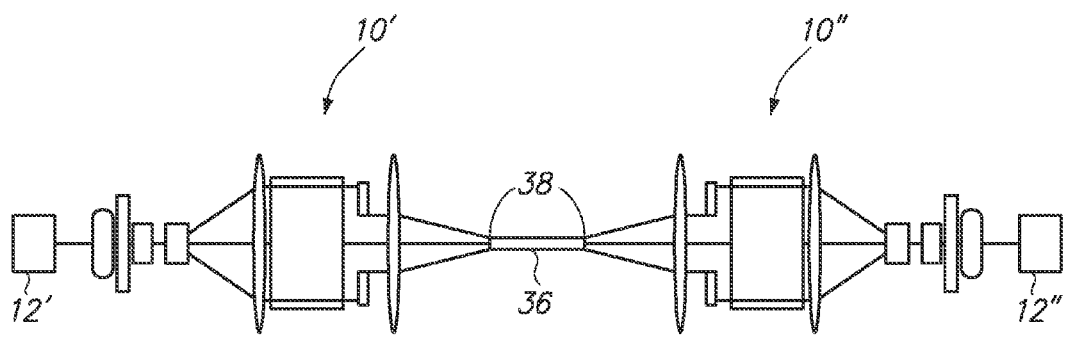
FIG. 2 illustrates one embodiment according to the description herein.

In FIG. 2, there is shown an embodiment wherein two laser apparatuses, 10' and 10", are used in conjunction to produce a finite-length open-ended hollow tube laser output 36 that is capped by end-cap laser outputs 38. Hollow tube laser output 36 and end-cap laser outputs 38 are generated at the location of a specimen stage having a particles or particles that are desired to be encapsulated/controlled and manipulated (the stage and particles not shown in this figure for clarity). Laser apparatus 10' uses its light source 12' to generate tube 36 while laser apparatus 10" uses its light source 12" to generate end-caps 38.

Figure 3A:
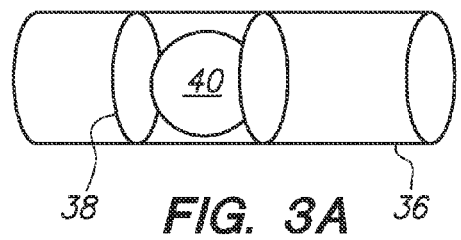
FIGS. 3A and 3B illustrate a particle and particles, respectively, as captured according to a first embodiment described herein.
Figure 3B:
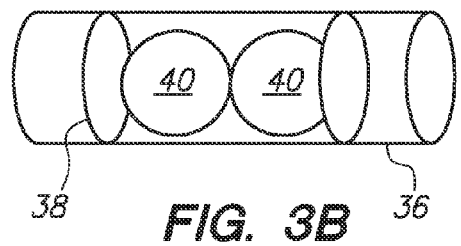

FIGS. 3A and 3B illustrate example encapsulations of a single particle 40 in FIG. 3A and multiple particles 40 in FIG. 3B. Manipulation of the particle(s) is made possible by movement of the laser generated hollow tube 36, laser-generated end-caps 38 and/or the specimen stage upon which the particle(s) rest (the specimen stage not shown in this figure for clarity).

Figure 4:
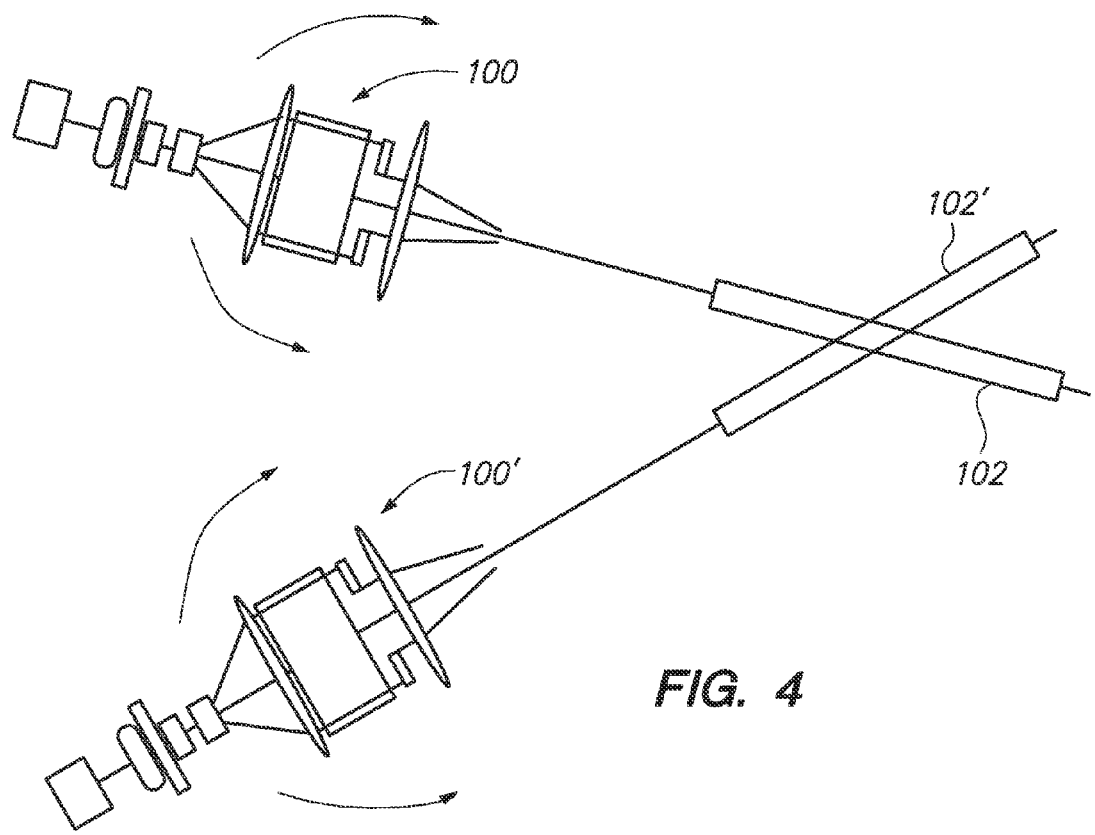
FIG. 4 illustrates another embodiment according to the description herein.

In FIG. 4, another embodiment is shown wherein two laser apparatus, 100 and 100', are used to generate a first finite-length open-ended hollow tube laser output 102 and a second finite-length open-ended hollow tube laser output 102', respectively. As can be seen, laser apparatuses 100 and 100' each include their own optical systems including light source, optics and modulator. In this instance, a particle stage exists at the intersection of laser outputs 102 and 102', the stage not shown in this figure for clarity. The hollow tube laser outputs, where intersecting, act to encapsulate a particle or particles. The intersecting hollow tube laser outputs act not only to control the particle(s) but, when pivoted, allow movement of the particle(s) in a desired direction (via movement of the intersecting beams). Movement of the particle(s) is also made possible by fixing the position of one of the laser apparatus and pivoting the other with respect to the first.

Figure 5A:
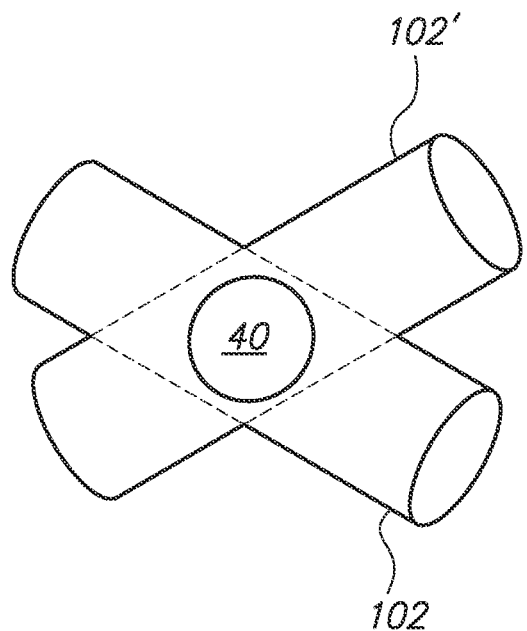
FIGS. 5A and 5B illustrate a particle and particles, respectively, as captured according to a second embodiment herein.
Figure 5B:
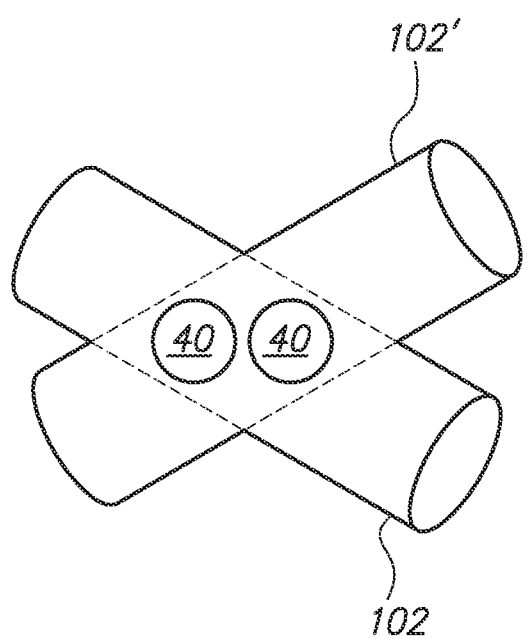

In FIGS. 5A and 5B, there are shown the particle encapsulation capabilities of intersecting hollow tube laser outputs 102 and 102', wherein a single particle 40 is shown encapsulated in FIG. 5A and multiple particles 40 shown encapsulated in FIG. 5B.

The generation of the hollow tube laser outputs and end-cap laser outputs will now be explained in detail.

In both instances, the hollow-tube laser output and end-cap laser outputs are generated from pupil functions/masks that are programmed into the programmable optical filter as used in the laser apparatuses disclosed herein. Initially a rectangular optical response (hereafter identified as a straight-line optical response) is produced. From the straight-line optical response, (1) a two foci/optical end-cap laser output can be generated or (2) a vortex beam/finite-length open-ended hollow tube laser response can be generated.

Description of generation of the straight-line optical response:

From the following diffraction formula:

$$E(\rho, z) = \frac{k}{iz}\int_0^\infty p(\rho_0)\left[J_0\left(k\frac{\rho\rho_0}{z}\right)\right]e^{ik\frac{\rho_0^2}{2}\left(\frac{1}{z}-\frac{1}{f}\right)}\rho_0 d\rho_0$$

where $E(\rho,z)$—Electric field at $\rho$ and $z$
$\rho$—the axial radial coordinate
$z$—the axial distance coordinate
$k$—the wave number
$i$—the imaginary number
$p(\rho_0)$—the pupil function
$\rho_0$—the axial radial coordinate of the pupil function
$J_0$—the Bessel function of the zeroth order
$e$—exponential It is established that the "Pupil" function is related to the axial electric field via the Fourier transform shown below:

$$E(\rho = 0, z) \propto P(u - u_0)$$

$$s = \left(\frac{\rho_0}{a}\right)^2 - .5$$

$$u_0 = \frac{a^2}{2\lambda f} \text{ and } u = \frac{a^2}{2\lambda z}$$

Figure 6:
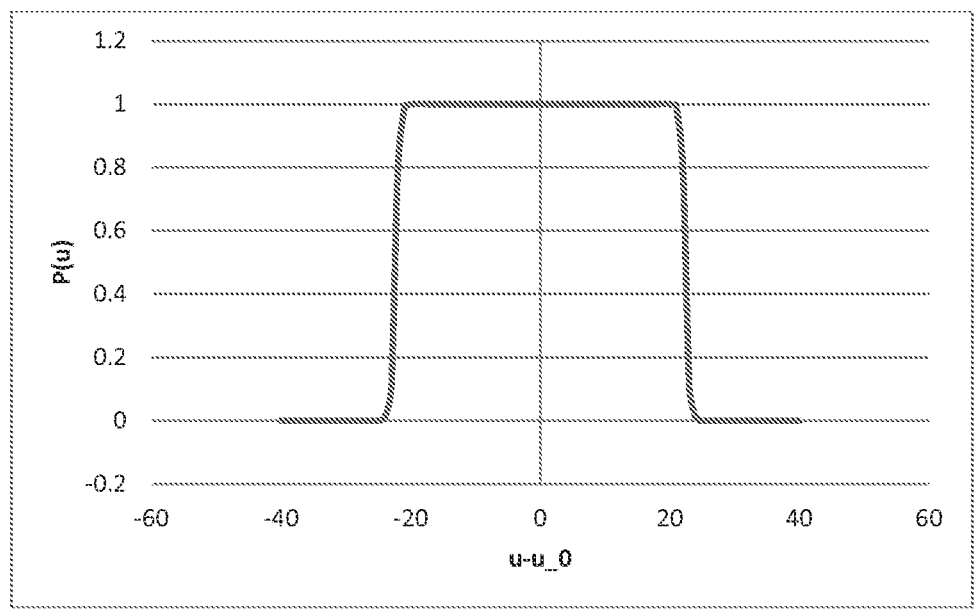
FIG. 6 represents light intensity versus space regarding the generation of a rectangular (straight line) optical response.

$u$ and $u\_0$—the chosen variables relating $z$ and $f$.
$s$—chosen variable substitution relating to $\rho_0$
$a$—aperture radius of the lens
$f$—is the focal length of the lens
$\lambda$—is the wavelength of light It has been established that to generate a constant intensity around the focus using a LCSLM, $P(u-u0)$ will look as shown in FIG. 6. See, for example, Jeffrey A. Davis, Don M. Cottrell, Juan Campos, Maria J. Yzuel, and Ignacio Moreno, "Encoding Amplitude Information onto Phase-Only Filters," Appl. Opt. 38, 5004-5013 (1999) and J. A. Davis, P. Tsai, D. M. Cottrell, T. Sonehara and J. Amako, "Transmission variations in liquid crystal spatial light modulators caused by interference and diffraction effects," Opt. Eng. 38, 1051-1057 (1999).

From Fourier transform theory, the pupil function of an axial optical response is $$p(s) = e^{i2\pi u_0 s}\text{sinc}(\pi L s)$$

where L is the width of $P(u)$.

Figure 7A:
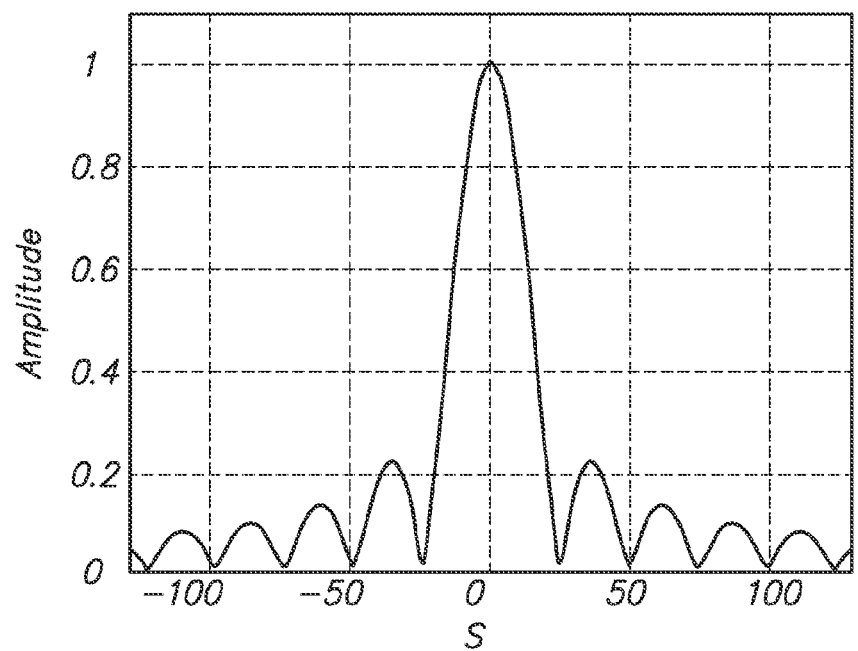
FIGS. 7A and 7B illustrate, respectively, amplitude and phase in s space as per the Fourier transform of the rectangular function of FIG. 6.
Figure 7B:
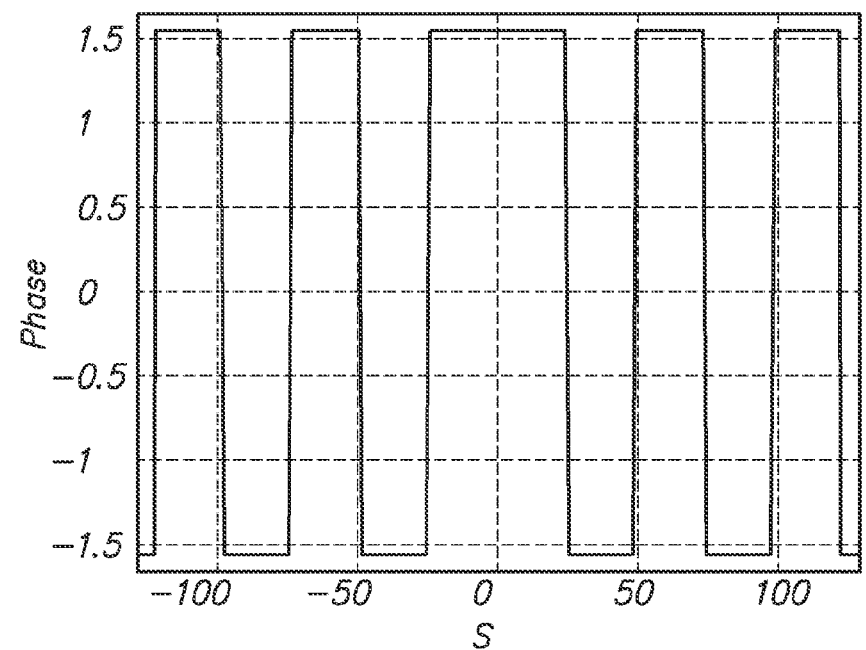

In this instance, L controls the length of the depth of focus. We are now going to refer to the above $p(s)$ is as "sincL", where L is a parameter. The plot of this pupil function's amplitude and phase is shown in FIGS. 7A and B, respectively. Note that the plots are of the "s" (space) variable. We can then go back to the substitution, $$s = \left(\frac{\rho_0}{a}\right)^2 - .5$$

and go back to the variable of physical (real) space $\rho\_0$.

Figure 8A:
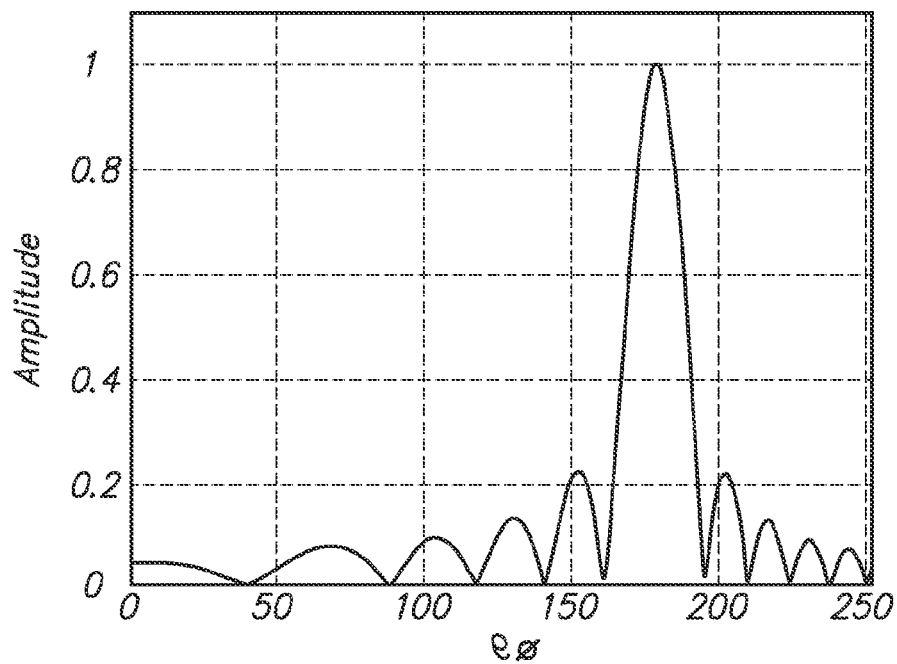
FIGS. 8A and 8B illustrate, respectively, a conversion of amplitude and phase from s space into physical space rho.
Figure 8B:
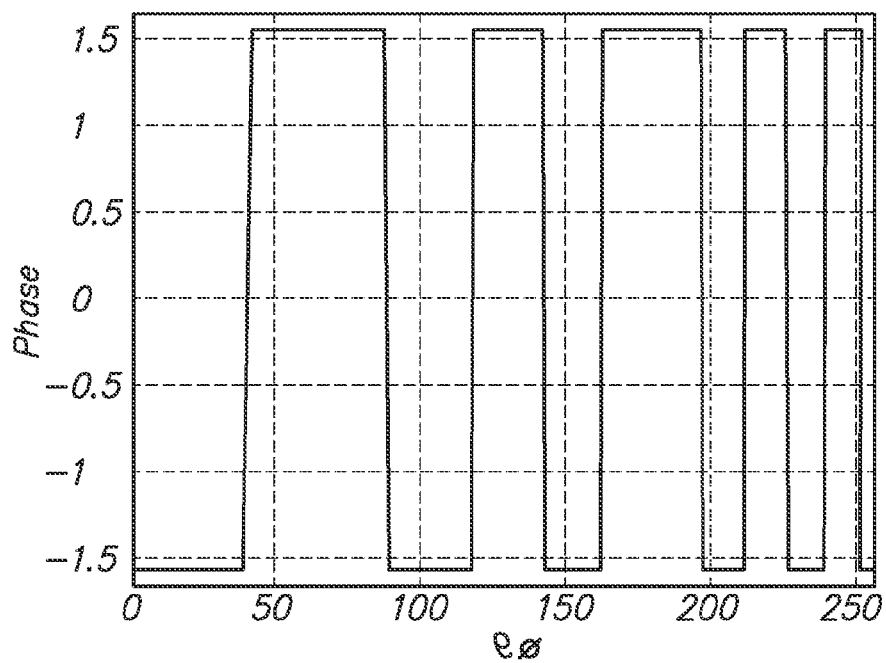
Figure 9B:
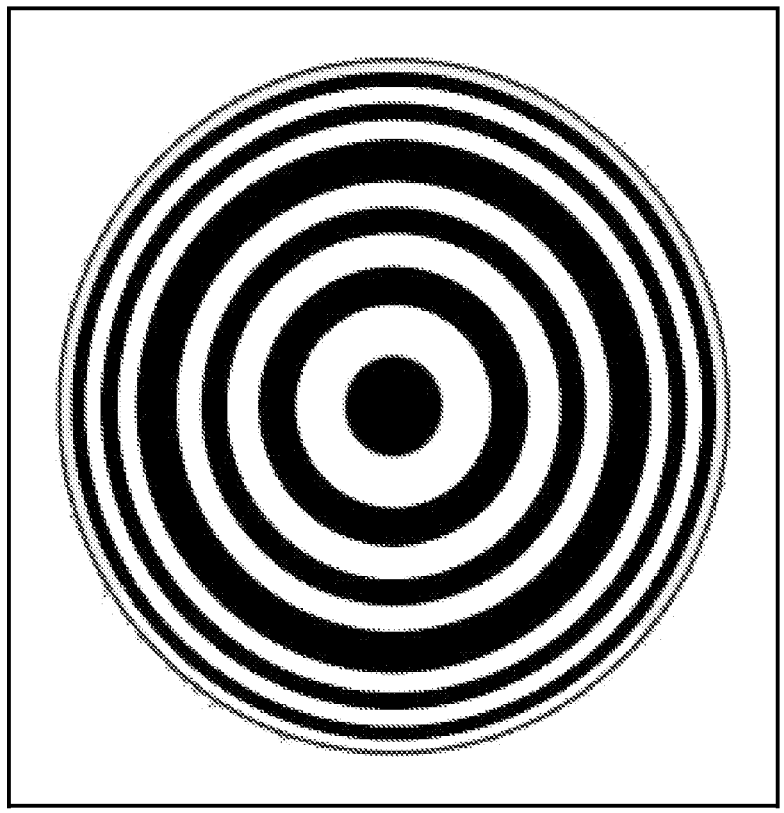
FIGS. 9A and 9B are, respectively, amplitude and phase two-dimensional pictures generated from the one-dimensional amplitude and phase data of FIG. 8.
Figure 9A:
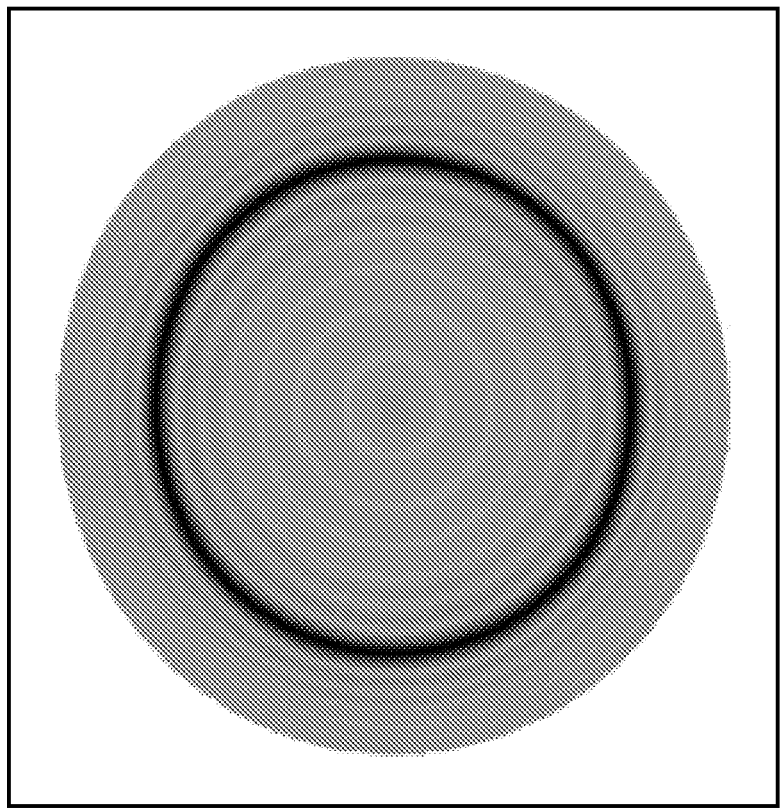

FIGS. 8A and 8B plot the one-dimensional amplitude and phase information, respectively, of the pupil function of the rectangular optical response. We use graphical generators to generate two-dimensional amplitude and phase data from the one dimensional amplitude and phase data by revolving the data of FIG. 8. This conversion is shown in FIG. 9A, for amplitude, and FIG. 9B, for phase. We have now generated a pupil function that has the optical response shown in FIG. 6.

Figure 10:
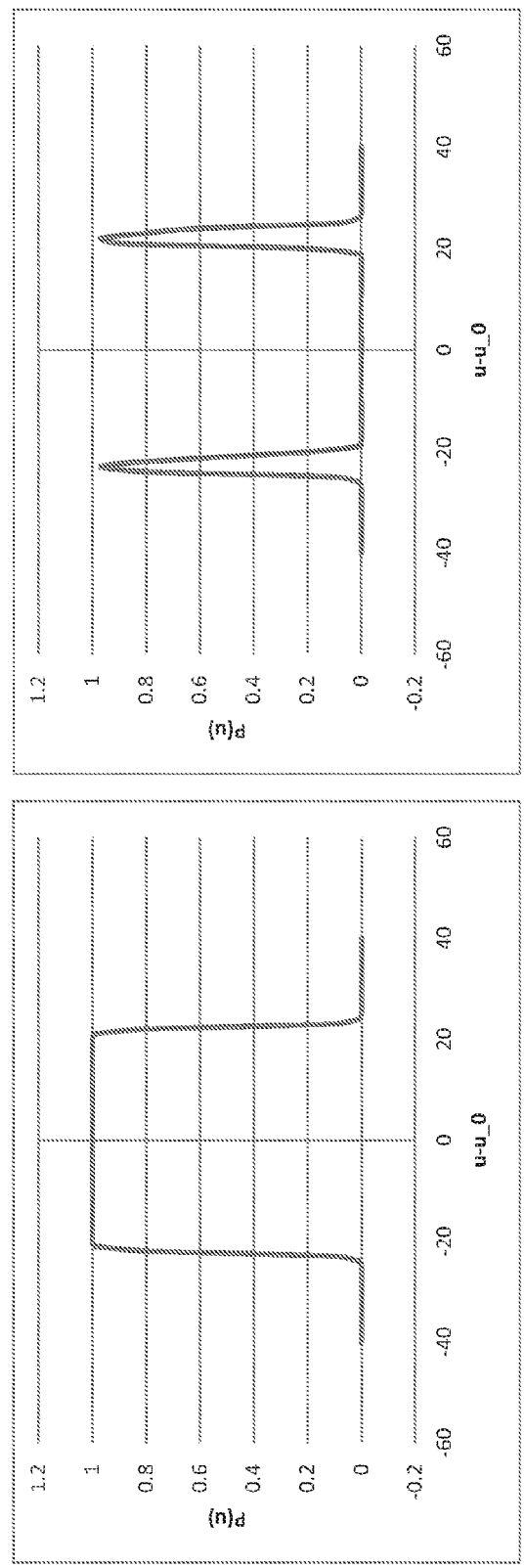
FIG. 10 represents application of edge enhancement filtering to a rectangular (straight-line) optical response.

Description of the generation of the two foci (end-caps) from the rectangular optical response:

As described below, we generate a mask-filter that has two axial foci by applying an edge enhancement filter to the output shown in FIG. 6. Such a derivative filter may be a Hilbert or the Derivative filter though other edge enhancement filters may be used. FIG. 10 shows the effect of use of an edge enhancement filter to the FIG. 6 output. Note that the figure at the right in FIG. 10 has two foci.

Edge enhancement via Hilbert filter:

Hilbert filter has the filter response of $$g(\upsilon) = i\text{sign}(\upsilon)$$

where "nu" is a dummy variable and sign(nu) is the Signum function.

To apply this filter to the sincL filter, we can generate the image of the filter response in "s" and multiply to the sincL filter in "s", and then convert to $\rho\_0$ the physical space of the LCSLM.

Figure 11B:
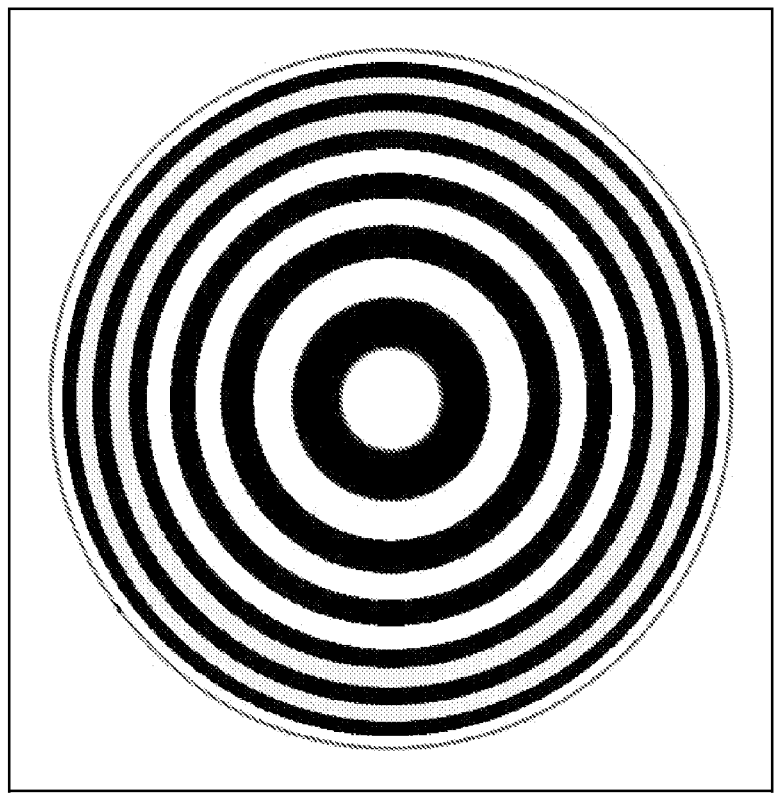
FIG. 11 shows at FIG. 11A application of Hilbert function edge enhancement to the two-dimensional phase shown in FIG. 9B and at FIG. 11B the product of it with sincL as described herein.
Figure 11A:
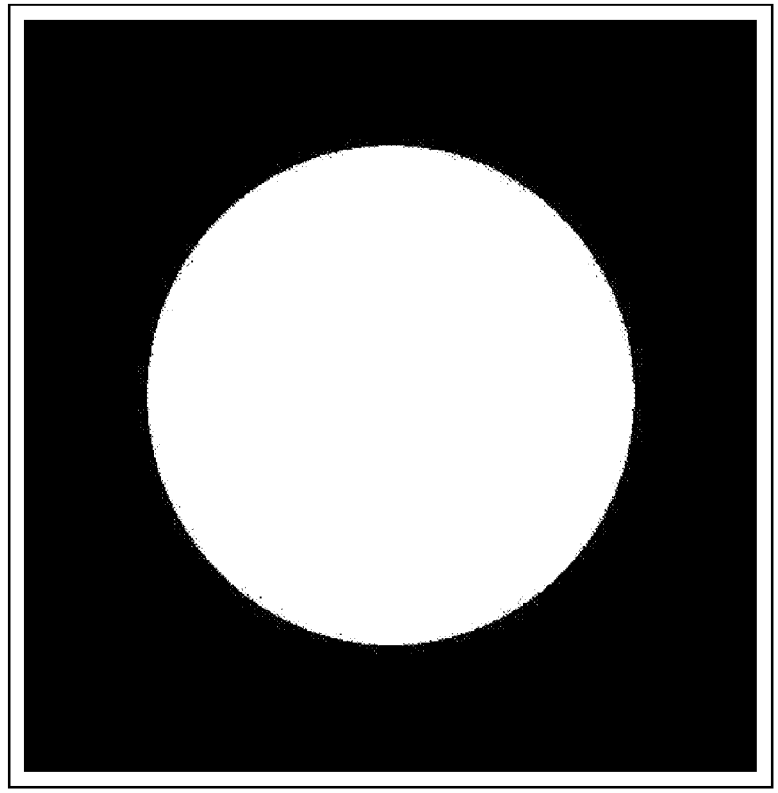

FIG. 11A shows phase, of the Hilbert filter in ρ_0 and at FIG. 11B the product of it with sincL. The Hilbert filter is phase-only, therefore the amplitude is not changed.

Another edge enhancement filter is the Derivative filter. With the filter response of:

$$g(\upsilon) = i2\pi\upsilon$$

Figure 12:
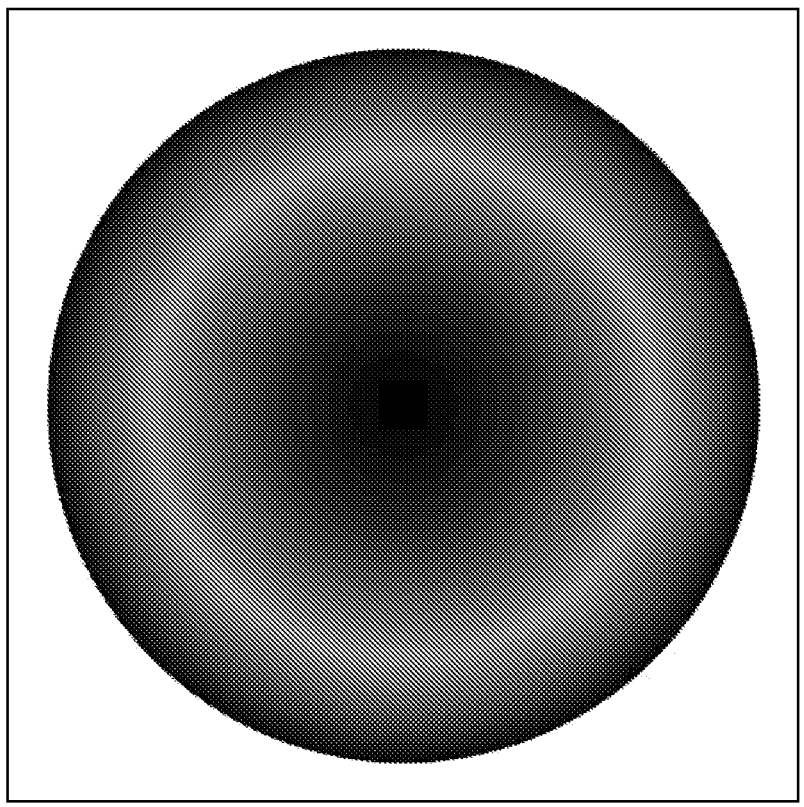
FIG. 12 illustrates use of the Derivative edge enhancement filter applied to the two-dimensional amplitude shown in FIG. 9A
Figure 13:
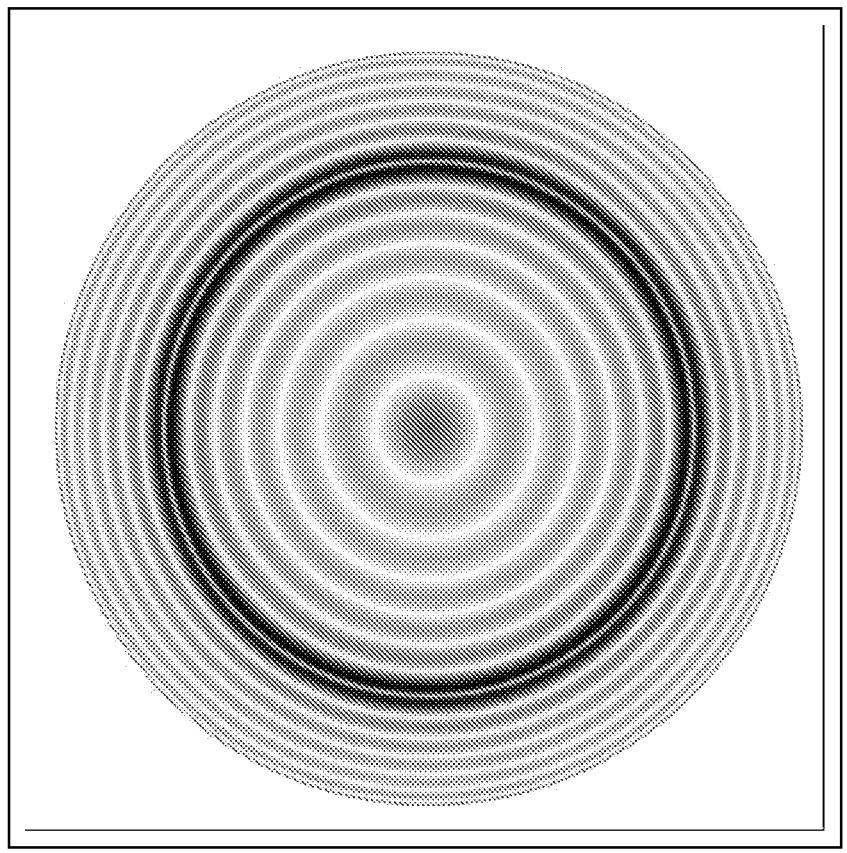
FIG. 13 shows the product shown in FIG. 12 with sincL.

Again, we generate "nu" to s and multiply to sincL and obtain the output in ρ_0 as shown in FIG. 12. The phase information is the same as the Hilbert response. The product of the Derivative filter to the sincL filter is shown in FIG. 13.

Control of the size of the generated two foci spots is as follows:

$$D = 1.22 \frac{\lambda f}{a},$$

where lamda is the wavelength of the collimated light used and f is the focal length. The equation above shows the relation of the foci spot diameter D to the radius "a" of the circular aperture lens used, element 28 of FIG. 1 for example. Control of the foci spot size is performed by changing "a".

Description of the generation of the hollow tube laser output:

There had been multiple publications on generating a mask-filter that can create a vortex beam (hereafter termed a hollow tube). See, for example, K. T. Gahagan and G. A. Swartzlander, Jr., "Optical vortex trapping of particles," Opt. Lett. 21, 827-829 (1996)

The mask is described by the following equation:

$$t(\theta) = e^{im\theta}$$

The radius of the vortex is $$\rho_n \approx \gamma_{n-1,1} \frac{\lambda f}{2\pi a}$$

where
lambda is the wavelength of the collimated light used and "a" the radius of circular aperture lens used, element 28 of FIG. 1 for example, and
$\gamma_{n-1,1}$ is the first root of the n−1 order of the Bessel function.

Notice that the filter response is phase only. This means that when we apply this filter, we are only multiplying it to the phase of sincL.

Figure 14:
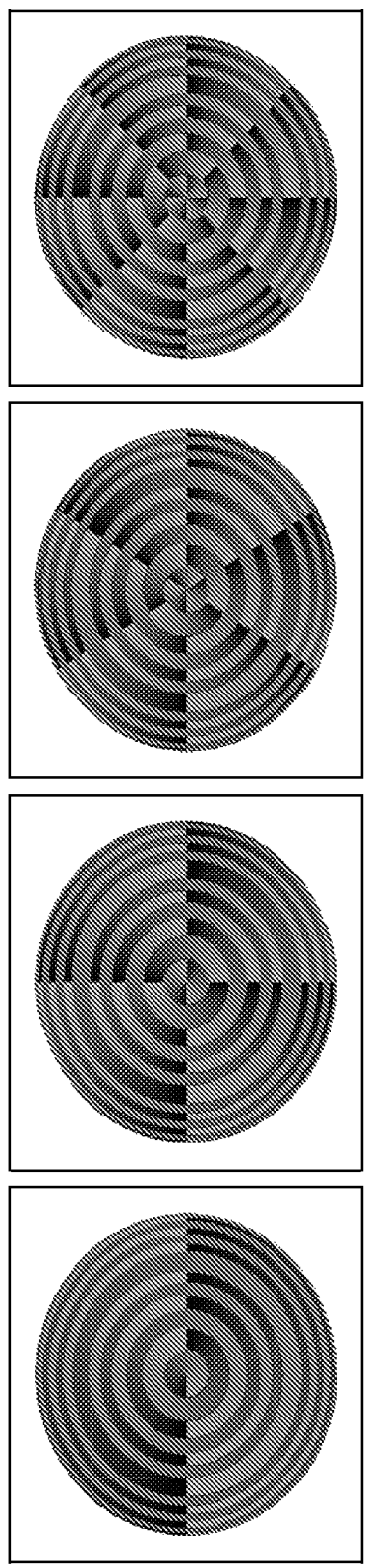
FIG. 14 illustrates, from left to right, phase pupil functions in order of increasing harmonics.

FIG. 14 shows pupil functions in order of increasing radius, m=1, 2, 3, 4 from left to right. The sizing of a hollow tube vortex is known, for example, see V. V. Kotlyar, S. N. Khonina, A. A. Kovalev, V. A. Soifer, H. Elfstrom, and J. Turunen, "Diffraction of a plane, finite-radius wave by a spiral phase plate," Opt. Lett. 31, 1597-1599 (2006).

The pupil functions of FIG. 14, when used as the phase information and the amplitude information of sincL, permit the generation of a hollow optical tube of length L and a radius rho.

Provided herein are novel methods to completely encapsulate and relocate one or more particulate(s) of interest in three dimensions. Utilizing programmable optical filters permits real-time dynamic manipulation of the optical encapsulations used. The optical patterns produced by the filters can be varied to produce alternate patterns for the encapsulating tube and end cap optical outputs. The physical size and shapes and resolution of the programmable optical filters used herein can vary to improve spatial resolution. Laser beams may enter the programmable filters directly from the laser or from one or more mirrors and lenses. Laser beams may exit the programmable optical filters and impinge upon the particulates of interest directly or indirectly with the use mirrors or lenses.

In view of the above, it will be understood that many additional changes in the details, materials, steps and arrangement of parts, which have been herein described and illustrated to explain the nature of the disclosure, may be made by those skilled in the art within the scope of the disclosure as expressed in the appended claims.

What is claimed is:

1. A method for capturing a particle comprising:
    locating a particle desired to be captured;
    generating a first finite-length open-ended hollow tube laser output around the particle so that the particle is within the first finite-length open-ended hollow tube laser output, the first finite-length open-ended hollow tube laser output being generated by a first pivotably moveable optical system; and
    generating a second finite-length open-ended hollow tube laser output around the particle so that the particle is within the second finite-length open-ended hollow tube laser output, the second finite-length open-ended hollow tube laser output being generated by a second pivotably moveable optical system, wherein the particle is enclosed at the intersection of the first and second finite-length open-ended hollow tube laser outputs.

2. The method of claim 1 wherein the particle is one of a plurality of particles enclosed within the intersection of the first and second finite-length open-ended hollow tube laser outputs.

3. The method of claim 1 wherein the particle is a dielectric particle.

4. The method of claim 1 wherein the hollow tube laser outputs are generated from collimated light.

5. A method for capturing and repositioning a particle comprising:
    locating a particle on a specimen stage, the particle desired to be re-positioned from a first position to a second position;
    generating a first finite-length open-ended hollow tube laser output around the particle so that the particle is within the first finite-length open-ended hollow tube laser output, the first finite-length open-ended hollow tube laser output being generated by a first pivotably moveable optical system;
    generating a second finite-length open-ended hollow tube laser output around the particle so that the particle is within the second finite-length open-ended hollow tube laser output, the second finite-length open-ended hollow tube laser output being generated by a second pivotably moveable optical system, wherein the particle is enclosed at the intersection of the first and second finite-length open-ended hollow tube laser outputs; and
    pivoting at least one of the first and second finite-length open-ended hollow tube laser outputs such that the particle is re-positioned from the first position to the second position.

6. The method of claim 5 wherein the particle is one of a plurality of particles enclosed within the intersection of the first and second finite-length open-ended hollow tube laser outputs.

7. The method of claim 5 wherein the particle is a dielectric particle.

8. The method of claim 5 wherein the hollow tube laser outputs are generated from collimated light.

* * * * *